United States Patent

Kim et al.

Patent Number: 6,118,997
Date of Patent: Sep. 12, 2000

[54] METHOD FOR CONTROLLING CALL ATTEMPT UNDER THE TRAFFIC OVERLOAD OF CDMA ENVIRONMENT

[75] Inventors: Kyung Soo Kim, Dejon-Shi; Kwang Hoo Kook, Seoul-Shi; Jee Hwan Ahn; Hun Lee, both of Daejon-Shi, all of Rep. of Korea

[73] Assignee: Electronics and Telecommunications Research Institute, Daejon-Shi, Rep. of Korea

[21] Appl. No.: 09/138,077

[22] Filed: Aug. 21, 1998

[30] Foreign Application Priority Data

Sep. 18, 1997 [KR] Rep. of Korea ............ 97-47533

[51] Int. Cl.[7] ................................. H04Q 7/20

[52] U.S. Cl. .............. 455/424; 455/453; 455/522; 370/335

[58] Field of Search .................. 455/423, 424, 455/453, 522, 69, 434, 517, 510, 524, 405, 67.1; 370/335, 342, 329, 252, 461, 447

[56] References Cited

U.S. PATENT DOCUMENTS

| | | | |
|---|---|---|---|
| 5,796,722 | 3/2000 | Kotzin et al. | 370/252 |
| 5,835,490 | 11/1998 | Park et al. | 370/342 |
| 6,044,072 | 3/2000 | Ueda | 370/335 |

OTHER PUBLICATIONS

Fleming et al. DS/SS CDMA Slotted Access Channel Performance Analysis, 1994, pp. 1189–1192.

Zbigniew Dziong et al., Adaptive Traffic Admission for Integrated Services in CDMA Wireless–Access Networks, Dec., 1996, p. 1737–1747.

*Primary Examiner*—Fan Tsang
*Assistant Examiner*—Marceau Milord
*Attorney, Agent, or Firm*—Cohen, Pontani, Lieberman & Pavane

[57] ABSTRACT

The call attempts are controlled under the traffic overload of CDMA environment provide a method in which when the message transmitted for a new call attempt is failed in the state of traffic overload, the speech quality and the number of mobile station which are on the line are maintained to the desired level by controlling the retransmitting of the message to the proper level.

1 Claim, 2 Drawing Sheets

METHOD FOR CONTROLLING CALL ATTEMPT UNDER THE TRAFFIC OVERLOAD OF CDMA ENVIRONMENT

BACKGROUND OF THE INVENTION

1. Field of the Invention

This invention relates to a radio resource management in the system which adopts CDMA as a multi-link method, more particularly, to a call attempt control method under the traffic overload of CDMA environment.

2. Description of the Related Art

A mobile station transmits messages (messages for call attempts, responses to the paging message etc.) on the access channel using the random access procedures. The parameters for the random access procedure are provided by access parameter messages which are transmitted on the paging channel from the base station.

As shown in FIG. 1, total procedure which transmits a message on the access channel and receives the ACK (acknowledgement) of the message is called as access attempt and each transmission in the access attempt is called as access probe. The mobile station transmits same messages to each access probe in the access attempt. Each access probe consists of access channel preamble and access channel message capsule as shown in FIG. 1.

Each access probe in the access attempt consists of access probe sequence and each access probe sequence consists of 1+NUM_STEP access probes. The first access probe in each access probe sequence is transmitted to the starting portion of access channel as an average power level which is proportional to the normal open loop power level.

Mean TX Output Power(dBm)=−73−mean input power(dBm)+ NOM_PWR(dB)+INIT_PWR(dB)

Succeeding access probes have more power of PWR_STEP than preceding access probes and are transmitted. The messages transmitted on the access channel can be divided by two types, that is, the response messages to the messages of base station and the request messages which are transmitted voluntarily by the mobile station and different procedures are used to transmit the two messages. That is, in the request messages as shown in FIG. 1, the persistence test is performed for every slot before the access probe sequence is transmitted and the access probe sequence starts to be transmitted when the test ends successfully. Therefore, the random delay time of PD (Persistence Delay) occurs. The mobile station produces random number PR which number is between 0 and 1 to perform the persistence test and the test succeeds when the value of PR is smaller than the value P.

When the access channel request is for the message transmission and position registration, the value of P can be calculated according to the equation 1.

$$p = \begin{cases} 2^{-PSIST(n)/4} \times 2^{-MSG\_PSIST} & \text{if, } PSIST(n) = 63 \\ 0 & \text{otherwise} \\ & n = 0, 1, \ldots, 9 \end{cases} \quad \text{[Equation 1]}$$

$$p = \begin{cases} 2^{-PSIST(n)} \times 2^{-MSG\_PSIST} & \text{if, } PSIST(n) = 7 \\ 0 & \text{otherwise} \\ & n = 10, 11, \ldots, 15 \end{cases}$$

When the access channel request is not for the message transmission and position registration, the value of P can be calculated according to the equation 2.

$$p = \begin{cases} 2^{-PSIST(n)/4} & \text{if, } PSIST(n) = 63 \\ 0 & \text{otherwise } n = 0, 1, , 9 \end{cases} \quad \text{[Equation 2]}$$

$$p = \begin{cases} 2^{-PSIST(n)} & \text{if, } PSIST(n) = 7 \\ 0 & \text{otherwise } n = 10, 11, , 15 \end{cases}$$

n in the equations 1 and 2 represents overload level imposed in the mobile station.

When one access probe sequence ends, the persistence test starts after delay of RS which is backoff delay having random value between 0 and 1+BKOFF. Also, a random time delay occurs between one access probe and the next one in the access probe sequence. After the access probes were transmitted, the mobile station stays for TA=(2×ACC_TMO)×80 ms to receive ACK from the base station. The access attempt ends if ACK is received during that time. However, if ACK is not received during that time, the transmission starts after delay of RT which is another backoff delay having random value between 0 and 1+PROBE_BKOFF slot.

In access attempt, a transmission timing point for an access a channel is determined by a PN randomization procedure, as shown in FIG. 1. For each access attempt, a mobile station calculates a delay time RN having value of a PN chip between zero(0) and $2^{PROBE\_PN\_RAN}-1$ by a hash function depending on ESN (electronic serial number) and then starts transmission after passing a delay time of the PN chip.

The access parameters which are transmitted to the paging channel from the base station of CDMA system for the random access procedure as follows.

TABLE 1

| parameter | value |
| --- | --- |
| NUM_STEP | 6 |
| NOM_PWR | 0 |
| INIT_PWR | 0 |
| PWR_STEP | 3 db |
| PSIST(n), n=0, 1, - - - , 15 | 0 |
| REG_PSIST | 0 |
| MSG_PSIST | 0 |
| BKOFF | 1 |
| ACC_TMO | 5 |
| PROBE_BKOFF | 0 |
| Max_Req_Seq | 2 |
| MAX_CAP_SIZE | 0 |
| PARM_SZ | 3 |

The important matter for maintaining speech quality is to control unnecessary interferences to the minimum level since the capacity of the CDMA system can be determined by the interference. When the mobile station starts a new call in the state of traffic overload, the messages on the access channel transmitted using the random access procedure are not serviceable due to the error occurring on the transmitting channel. Accordingly, the mobile station which d id not receive ACK message to the transmission message retransmits the same message fixed times after desired time by the access procedure. The total power which the mobile station transmits becomes considerable as the number of mobile stations which require new calls increases, and the power acts as interference to the call which is on the line and then acts as elements interfering with the total speech quality.

In the conventional art, since it was determined that the transmitting power at the access attempt of mobile station caused a little effect on the system, the retransmitting effect was not considered due to the message failure transmitted on the access channel in the state of traffic overload. Therefore, the speech quality is not good in the state of traffic overload.

SUMMARY OF THE INVENTION

The object of the invention is to provide a method in which when the message transmitted for a new call attempt is failed in the state of traffic overload, the speech quality and the number of mobile station which are on the line are maintained to the desired level by controlling the retransmitting of the message to the proper level.

The method of invention includes the following steps confirming if access messages more than 8 calls arrived or not during a fixed time; ending the process or defining probability of persistence test according the confirmation result; confirming the number of access probes arriving successfully at the base station for a fixed time; returning to the step of defining the probability of persistence test after increasing the persistence level by 1, or confirming again the number of access probes arriving successfully at the base station for the fixed time, according to the result of confirmation; returning to the step of defining the probability of persistence test after decreasing the persistence level by 1, or confirming if the persistence level is maintained for a fixed time, according to the result of confirmation; and returning to the step of defining the probability of the persistence test, or ending the process, according to the result of the confirmation.

The invention relates to the procedure of overload control using the parameters of CDMA system which is in service now as follows. That is, spreading spectrum bandwidth (w)=1.2288 Mbps, speech transmission rate=9.6 Kbps, average of Eb/NO=7 dB, distribution of Eb/NO=2.5 dB, call breaking probability=0.001, speech activity coefficient ($\rho$)= 0.375, the rate of interference of his cell to the interference of other cell (f)=0.55, the rate of background noise to the total noise ($\eta$)=0.1. The processing capacity of one cell using the above parameters is calculated as 18. 19 Erlang.

BRIEF DESCRIPTION OF THE DRAWINGS

The above and further objects, aspects and novel features of the invention will become more apparent from the following detailed description when read in connection with the accompanying drawings.

DESCRIPTION OF THE PREFERRED EMBODIMENT

Figure 1:
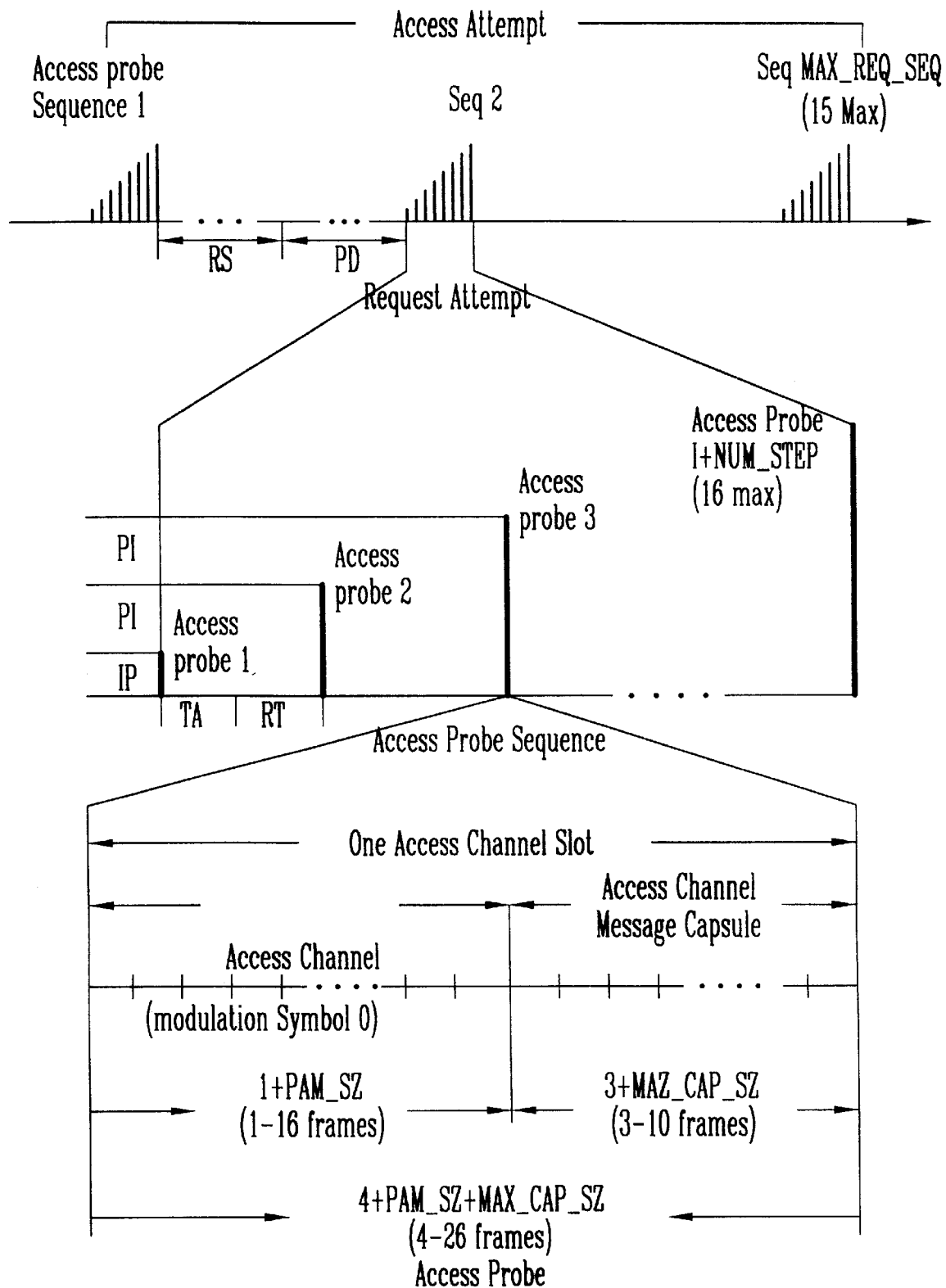
FIG. 1 shows the conceptional view of channel request attempt procedure performed when the mobile station requests access channel.
Figure 2:
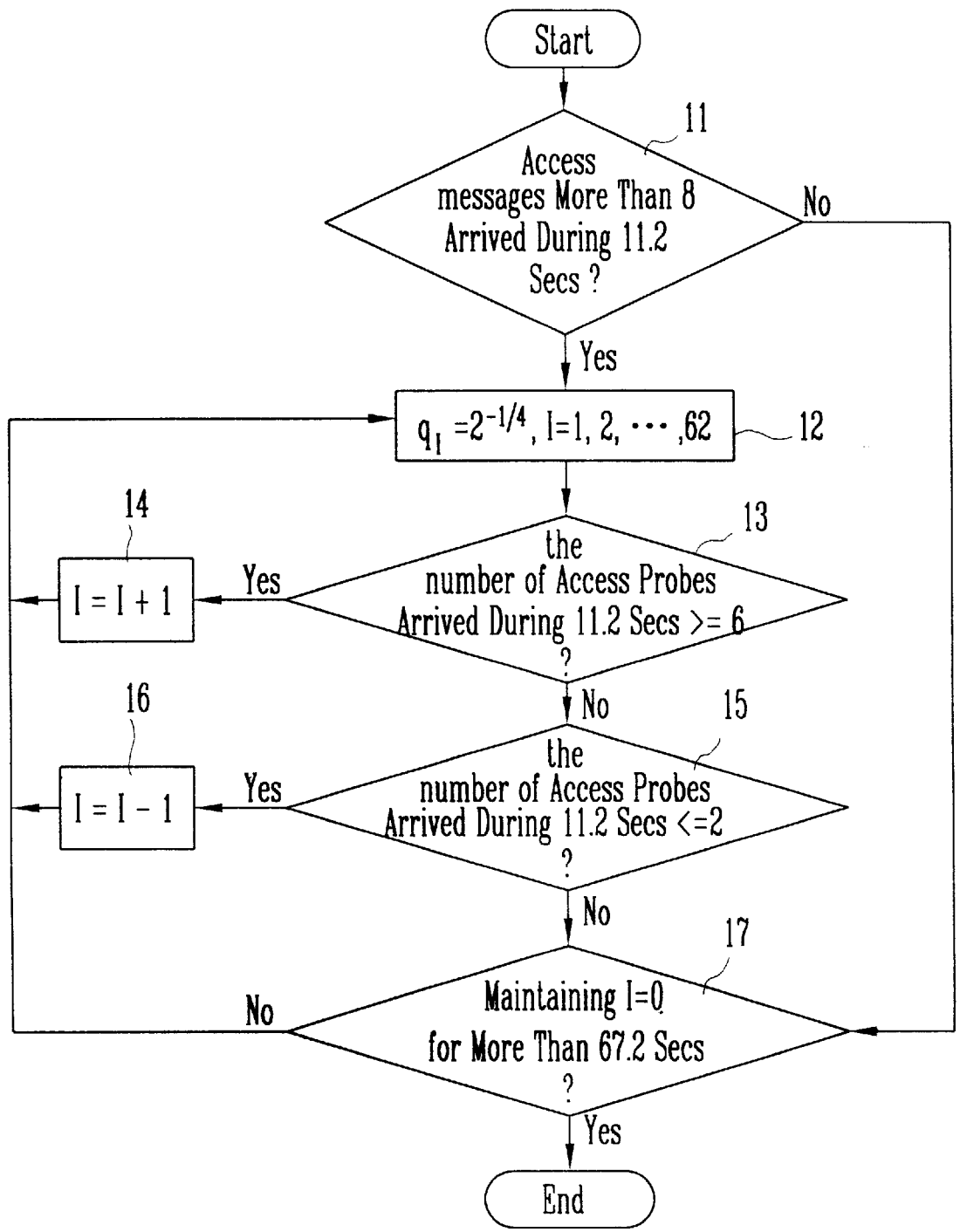
FIG. 2 shows a flowchart which explains the control method of call attempt in the traffic overload state of CDMA environment.

FIG. 2 shows a flowchart which explains the control method of call attempt in the traffic overload state of CDMA environment.

After calculating the arrival rate of normal state from the processing capacity of one cell, the condition which the starting probability of overload is 0.001 in the state of normal state is obtained. That is, if some calls more than a fixed number are arrived in the fixed time, the attempt times of access probe can be controlled by adding the persistence level by 1 when the number of access probes arriving at the base station in the fixed time are over 3 times of normal state, and by subtracting the persistence level by 1 when it is less than the normal state. The procedure controlling the persistence level continues until the state of persistence level=0 remains for a fixed time.

Now, a more detailed description of method for controlling access call attempt is given.

From the starting signal, the arrival rate of normal state from the traffic processing capacity (18.19) of one cell is calculated as 0.1819 (call/second) in the step 11. That is, since the 2 call, in average, are occurred for 11.2 seconds in the normal state, the overload control starts if calls more than 8 calls arrives for 11.2 seconds to make the starting probability of control about 0.001. Here, the overload control ends if calls more than 8 calls do not arrive for 11.2 seconds.

In the step 12, the overload control of access attempt controls the access probe transmission by the persistence level. If the persistence level is 1, the probability of passing the persistence test is defined (qI=2¼, I=1, 2, . . . 62) and the step moves to step 13.

The number of access proves arriving successfully at the base station for 11.2 seconds is confirmed in the step 13. If it is more than 6 (3 times of normal level), the step moves to step 14 and returns to step 12 after increasing the persistence level by 1. And if it is 6 and less, the step moves to step 15 and the number of access probes arriving successfully at the base station for 11.2 seconds is confirmed. If the confirming result is 2 and less (below the normal level), the step moves to the step 16 and returns to the step 13 after decreasing the persistence by 1. If the conforming result is more than 3 and less than 5, the step moves to the step 17 and decreases the attempt number of the access probes by maintaining present persistence level. If the state which the persistence level is 0 is maintained for more than 67.2 seconds, the overload control ends. However, if not, the step returns to the step 12.

The method of the invention can increase the number of mobile station to service, increases the speech quality and use the cell capacity of base station most efficiently by controlling the failed call retransmitting.

What is claimed is:

1. A method for controlling call attempt message traffic overload from a plurality of mobile stations to a base station of a CDMA environment, each message in the message traffic overload comprising a plurality of access attempts defining access probes said method comprising the steps of:

(a) confirming if more than 8 access messages have arrived during a predetermined fixed time interval;

(b) defining a probability of persistence test in accordance with step (a);

(c) determining whether the number of access probes arriving successfully at the base station exceeds a first predetermined threshold level for said predetermined fixed time interval;

(d) when the number of successfully arrived access probes exceeds said first threshold level, increasing the persistence level by 1; and returning to step b;

(e) determining whether the number of access probes arriving successfully at the base station exceeds a second predetermined threshold level for said predetermined fixed time interval;

(f) when the number of successfully arrived access probes exceeds said second threshold level, decreasing the persistence level by 1; and returning to step b;

(g) determining whether the persistence level is maintained for said predetermined fixed time interval; and (h) if the persistence level is not maintained for the predetermined fixed time interval, returning to step (b).

* * * * *